United States Patent
Lazerson

(10) Patent No.: US 7,680,728 B2
(45) Date of Patent: Mar. 16, 2010

(54) CREDIT/FINANCING PROCESS

(75) Inventor: Jeffrey M Lazerson, Laguna Niguel, CA (US)

(73) Assignee: Mortgage Grader, Inc., Laguna Niguel, CA (US)

( * ) Notice: Subject to any disclaimer, the term of this patent is extended or adjusted under 35 U.S.C. 154(b) by 2958 days.

(21) Appl. No.: 10/139,418

(22) Filed: May 6, 2002

(65) Prior Publication Data

US 2003/0036995 A1    Feb. 20, 2003

Related U.S. Application Data

(60) Provisional application No. 60/312,919, filed on Aug. 16, 2001, provisional application No. 60/327,026, filed on Oct. 3, 2001, provisional application No. 60/362,314, filed on Mar. 5, 2002.

(51) Int. Cl.
*G06Q 40/00* (2006.01)
(52) U.S. Cl. .......................................... 705/38; 705/35
(58) Field of Classification Search ....................... None
See application file for complete search history.

(56) References Cited

U.S. PATENT DOCUMENTS

| 5,940,812 | A | 8/1999 | Tengel et al. | |
|---|---|---|---|---|
| 5,966,699 | A | 10/1999 | Zandi | |
| 5,995,947 | A | 11/1999 | Fraser et al. | |
| 6,014,645 | A * | 1/2000 | Cunningham | 705/38 |
| 6,321,202 | B1 * | 11/2001 | Raveis, Jr. | 705/1 |
| 6,385,594 | B1 * | 5/2002 | Lebda et al. | 705/38 |
| 6,611,816 | B2 * | 8/2003 | Lebda et al. | 705/38 |
| 2001/0005829 | A1 | 6/2001 | Raveis, Jr. | 705/1 |
| 2001/0037230 | A1 | 11/2001 | Raveis, Jr. et al. | 705/9 |
| 2001/0047282 | A1 | 11/2001 | Raveis, Jr. | 705/7 |
| 2002/0049624 | A1 | 4/2002 | Raveis, Jr. | 705/8 |
| 2002/0077964 | A1 | 6/2002 | Brody et al. | |
| 2002/0077970 | A1 | 6/2002 | Lebda et al. | |

(Continued)

OTHER PUBLICATIONS e-Loan: home Purchase Options; http://web.archive.org/web/19980127150116/eloan.com/cgi-bin/qualselect E-Loan: A better way to get a loan; http://web.archive.org/web/20000622033215/http://eloan.com/Home Mortgages and Loans from E-Loan; http://web.archive.org/web/20040303144344/eloan.com/s/show/purchase?adjper=0&agent=....*

(Continued)

*Primary Examiner*—James Kramer
*Assistant Examiner*—Rajesh Khattar
(74) *Attorney, Agent, or Firm*—Knobbe, Martens, Olson & Bear LLP

(57) ABSTRACT

A method for a borrower to obtain and/or evaluate desired financial services is disclosed. Personal information from the borrower is obtained and recorded. The personal information includes reasons that the borrower wants to obtain the financing. Financing evaluation information based on pre-established and objective criteria used by at least one established financial institution that provides financing of the type sought by the borrower is obtained and recorded. A credit grading for the borrower is determined based on the personal information, and the financing evaluation information. The credit grading is determined by an independent entity that will not provide the financing to the borrower. The financing may be a loan, such as a mortgage loan or an auto loan or the financing may be the issuance of a credit card or a line of credit.

6 Claims, 3 Drawing Sheets

U.S. PATENT DOCUMENTS

2002/0103789 A1     8/2002     Turnbull et al.
2003/0208412 A1     11/2003     Hillestad et al.

OTHER PUBLICATIONS

E-Loan: Mortgage Rate: http://web.archive.org/web/20070402215055/http://eloan.com/cgi-bin/quoteinput?linksrc=sr...
E-Loan; http://web.archive.org/web/20070402215055/http://eloan.com/s/show/qualinput?context=pu...E-Loan: Pre-Qualifying for a Mortgage; http://web.archive.org/web/19980127150751/eloan.com/cgi-bin/qualinput?proptype=&pro....*
E-Loan: Description of the Loan Process; http://web.archive.org/web/19980127151111/eloan.com/cgi-bin/loanprocess?proptype=&p...myFICO-About Credit Scores; http://www.myfico.com/CreditEducation/CreditScores.aspx Credit Score; http://en.wikipedia.org/wiki/Credit_score.*
E-Loan; http://web.archive.org/web/19980127150039/http://eloan.com/E-Loan: http://web.archive.org/web/19981212013811/http://eloan.com/Internet Archive Wayback Machine; http://web.archive.org/web/*/www.eloan.com Internet Archive Wayback Machine; http://web.archive.org/web/*/http://www.lendingtree.com/.*
Internet Archive Wayback Machine; http://web.archive.org/web/*/www.bankrate.com.*
"LoansDirect Advances Online Lending Technology With the Industry's First 100% Online Mortgage," Business Wire, New York, Feb. 17, 2000, p. 1.
John Hagel III and Marc Singer, "*Net Worth: Shaping Markets When Customers Make the Rules*," Harvard Business School Press, pp. 10, 13-20, 23-30, 42, 43, 49-52, 112-170, 183-184, 231, 242 (1999).
Seth Godin, "*Permission Marketing-Turning Strangers into Friends, and Friends into Customers*," Simon & Schuster, Chapter Two, pp. 40-52 (1999).
Grant E. Mitchell, "Will RESPA Reforms Bring Bundling to Settlement Services?" *Mortgage Banking*, May 2002 issue, p. 87-90.
Complaint filed by Mortgage Grader, Inc., against BankLoans.com LLC, et al. on Oct. 15, 2009, alleging infringement of U.S. Pat. 7,366,694, which is a continuation-in-part of the present application.

* cited by examiner

CREDIT/FINANCING PROCESS

CROSS-REFERENCE TO RELATED APPLICATIONS

This application claims the benefit of U.S. provisional application No. 60/312,919, filed Aug. 16, 2001, the entire contents of which are hereby incorporated by reference, U.S. provisional application 60/327,026 filed Oct. 3, 2001, the entire contents of which are hereby incorporated by reference, and U.S. provisional application 60/362,314 filed Mar. 5, 2002, the entire contents of which are hereby incorporated by reference.

BACKGROUND OF THE INVENTION

The present invention relates generally to financial transactions including a method for a borrower to evaluate and/or obtain financing, e.g., a loan or a credit card.

Shopping for financing (e.g., a loan, such as a mortgage) can be a complicated time-consuming process. The mortgage industry has been slow to empower borrowers in order to save them time, make their lives easier, and help them determine their best loan options. Because of this, borrowers, and in particular, credit-impaired borrowers, are often overcharged. The Coalition of Responsible Lending has stated that ten million borrowers have been overcharged up-front fees of $11,000,000,000, which equates to ten million borrowers being overcharged an average of $1,100 each. The practice of offering borrowers loans at rates that are higher than warranted by the credit history of the borrower is sometimes referred to as predatory lending. Predatory lending is a very difficult and challenging problem to recognize in practice as many lenders may use procedures that conceal the nature of the predatory practices.

There are newspaper or Internet referral sites which publish interest rates for one or more lenders. However, the user must interact individually with each prospective lender. It is very time consuming for a borrower to investigate each of the potential lenders. Furthermore, each prospective lender typically runs a credit report on the borrower, causing there to be multiple inquiries on the borrower's credit report. The basis for an adverse decision is often unknown.

There is thus a need for a way to help a borrower to avoid predatory lending and paying higher than justified loan rates.

BRIEF SUMMARY OF THE INVENTION

One aspect of the present invention may be regarded as a method for reducing predatory lending when a borrower seeks financing. Personal information is obtained and recorded regarding the reasons that the borrower wants to obtain the financing. Loan evaluation information is obtained and recorded. The loan evaluation information is preferably based on, or the same as the criteria used by at least one established financial institution that may provide financing to the borrower. A credit grading is determined for the borrower based on pre-established and objective criteria, the personal information and the loan evaluation information. The credit grading is performed by an entity that is not loaning money to the borrower.

The financing sought by the borrower may be a loan. The loan may be, for example, a mortgage loan, a personal loan, an auto loan, or a student loan. The financing sought by the buyer may also be a credit card.

The credit grading information may be provided to the borrower so the borrower can use the information to evaluate his financing options, e.g., different loans.

The credit grading information may be provided to at least one financial institution. The financial institution evaluates providing financing to the borrower based on the credit grading information. The credit grading information may be provided to a plurality of financial institutions or to others authorized by the borrower. The information provided by the borrower is preferably, but optionally handled in a confidential manner and not disclosed to others. The credit score or grade is also preferably handled in a confidential manner and is not disclosed unless authorized by the borrower.

BRIEF DESCRIPTION OF THE DRAWINGS

These, as well as other features of the present invention, will become apparent upon reference to the drawings, wherein.

DETAILED DESCRIPTION

An improved way for borrowers to shop for financing (e.g., loans, such as mortgage or auto loans or credit cards) is provided. A person or a group of people (borrower(s)) are interested in receiving financing, such as a mortgage for a home. The mortgage could be a purchase, refinance or cash-out refinance home loan. It could be first, second or third mortgage lien. For purposes of illustration herein, a mortgage will be used in illustrating and describing the present invention. However, it will be appreciated that the loan can be another type of loan, such as an auto loan, a personal loan, a student loan, etc. or that the financing may not be a loan at all, but may be directed to obtaining a credit card or arranging other types of financial credit, for example, a line of credit.

A series of questions are asked of the borrower in order to correlate the most appropriate financing with the borrower's desires. Credit and financial information is also acquired from the borrower. That information is compared with financing qualification criteria and/or credit qualifying criteria in order to provide a borrower with an impartial credit evaluation or loan evaluation based on the submitted information. That credit evaluation or loan evaluation can be used as a check against commercial lenders offering loans to the borrower to allow the borrower to compare against the loan rate or credit rating offered to the borrower by lenders in order to ensure the borrower receives the most desirable loan based on the credit available to that borrower.

Figure 1:
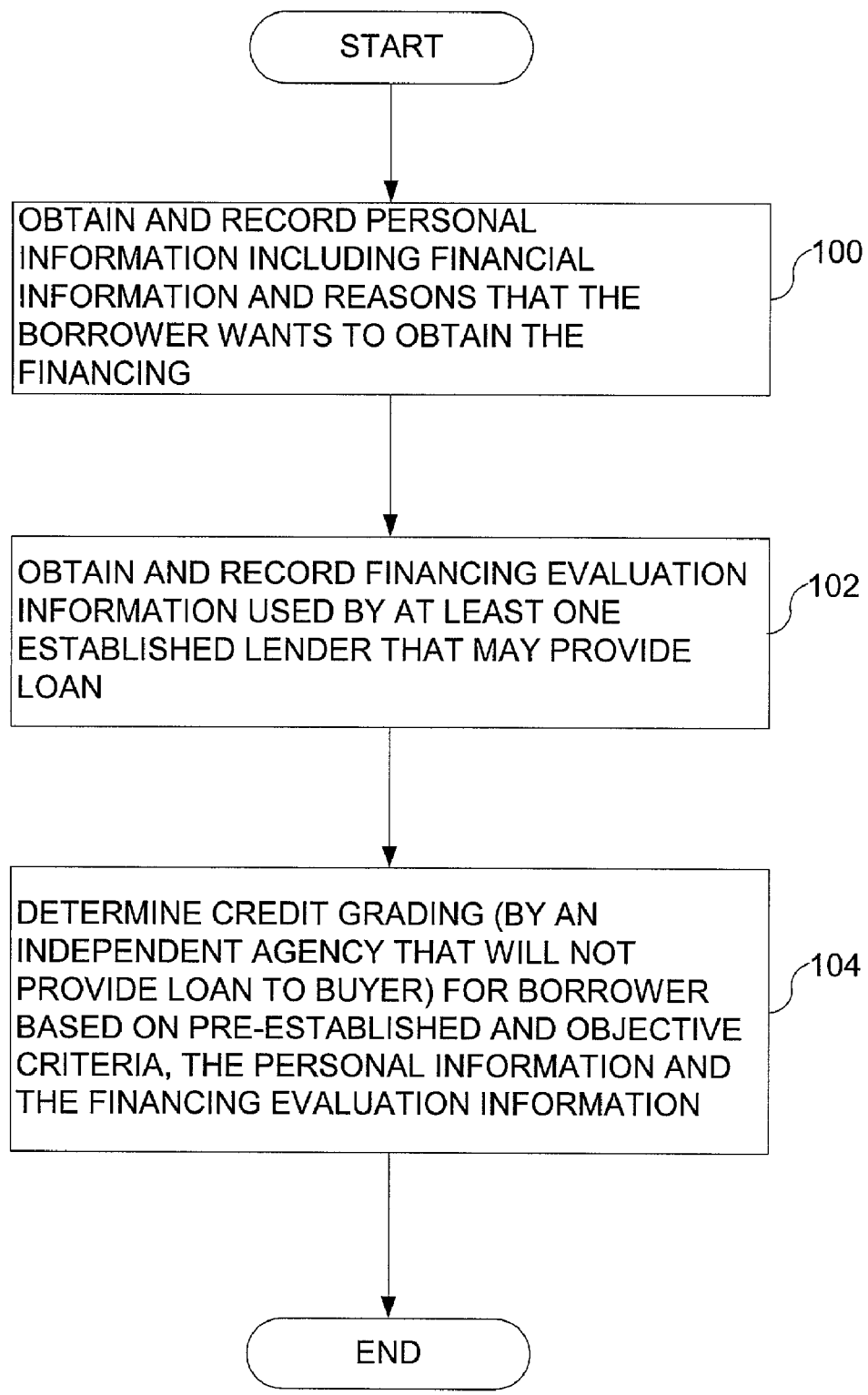
FIG. 1 is a flow diagram illustrating an exemplary method for a user to obtain financing in accordance with the present invention.
Figure 2A:
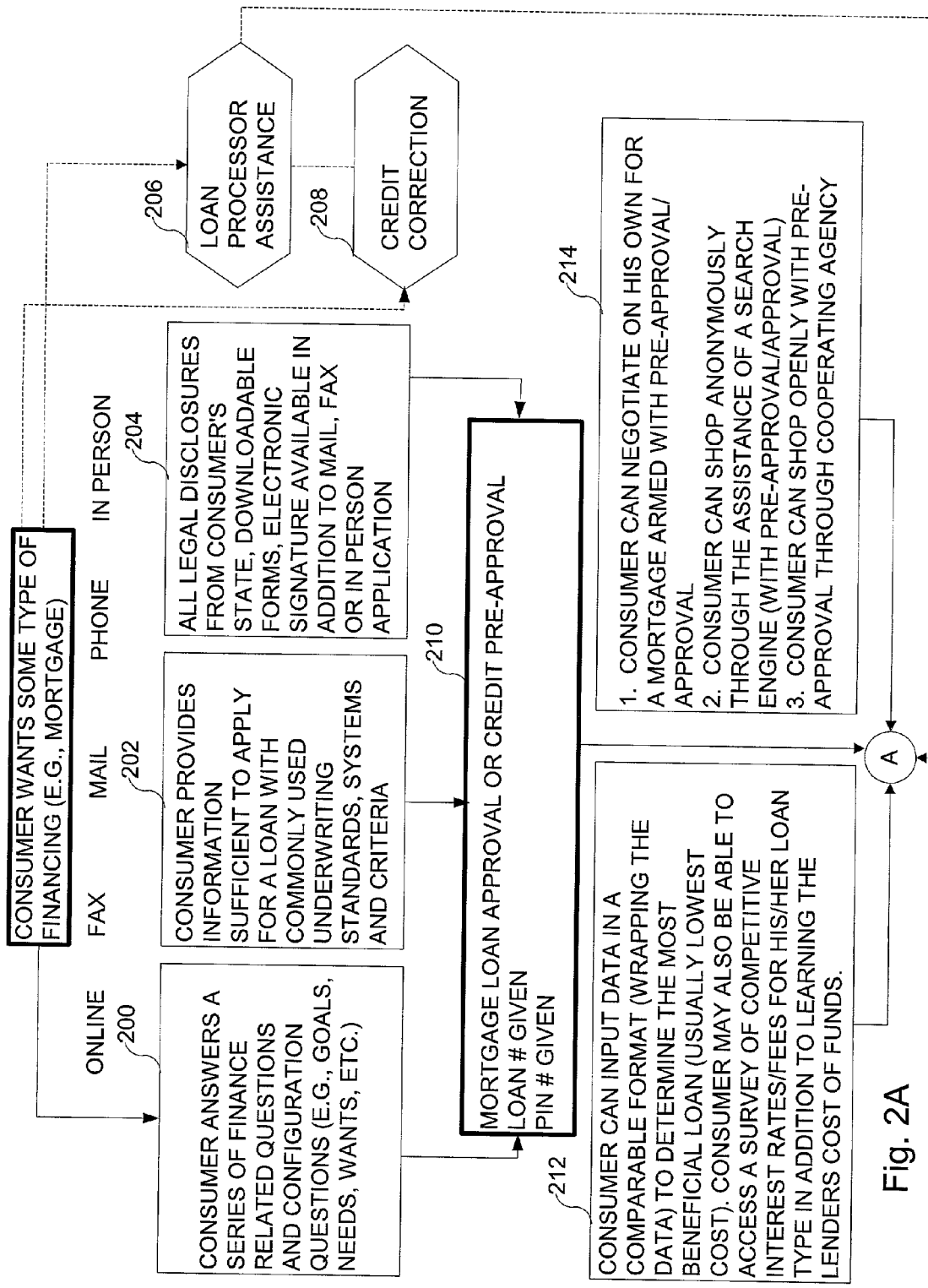
FIGS. 2A-2B shows a block diagram illustrating further detail of various aspects of the method illustrated in FIG. 1.
Figure 2B:
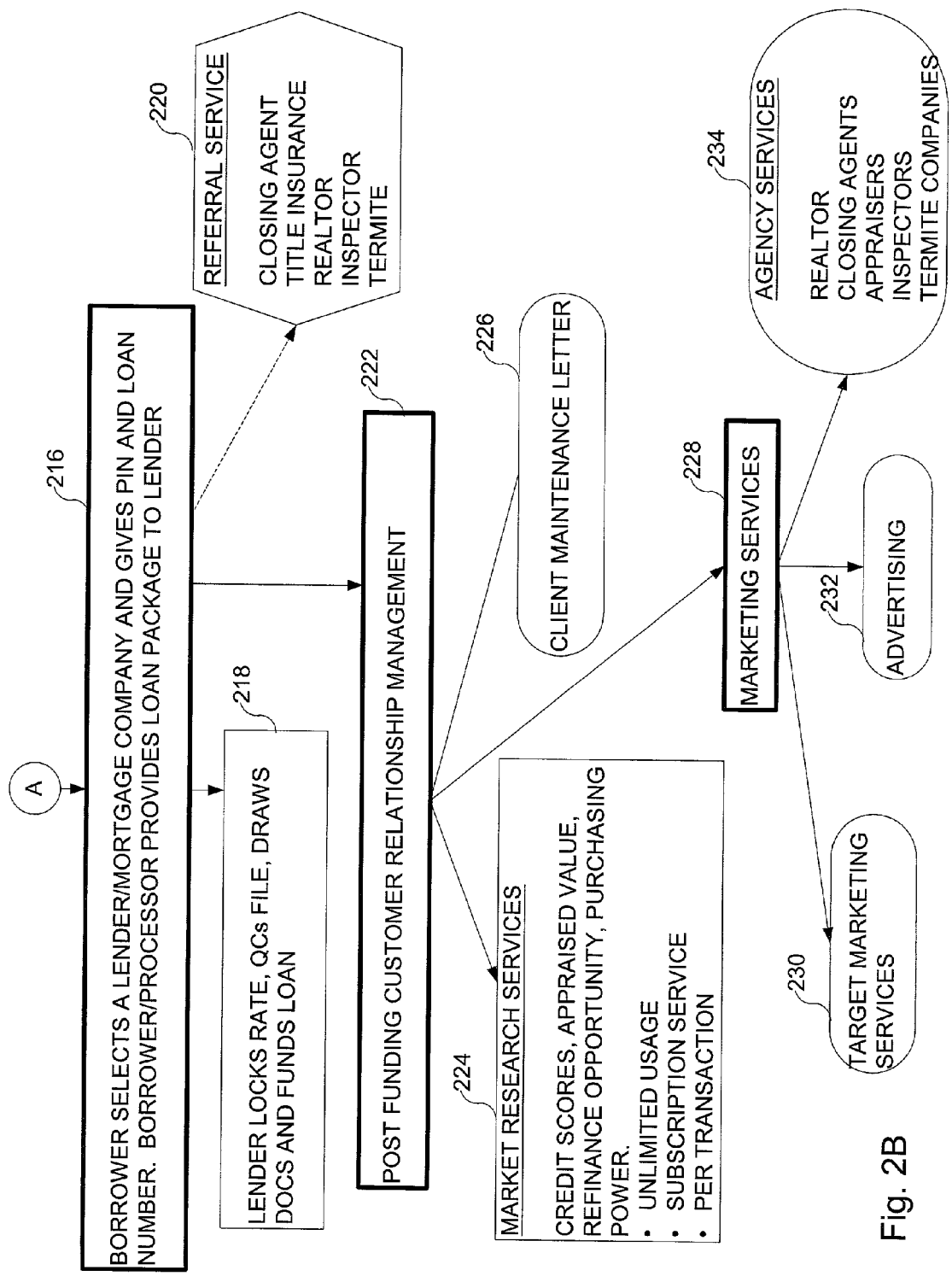

Referring now to the drawings wherein the showings are for purposes of illustrating preferred embodiments of the present invention only, and not for purposes of limiting the same, FIG. 1 is a flow diagram illustrating an exemplary method for obtaining a mortgage. FIGS. 2A-2B are a block diagram illustrating in further detail various aspect of the method illustrated in FIG. 1.

The logic of FIG. 1 moves from a start block to block 100 where the user is asked a series of questions, either verbally, or visually, for example, in a written format. In exemplary embodiments, this process is performed over the Internet by viewing questions on a computer display and sending responsive information. The responsive information may be sent over the Internet, e.g., by filling out and submitting the information in an online form, via attached documents, via scanned documents, etc. It will be appreciated that the user could also answer the question in person, over the phone, via facsimile, via postal mail, etc. In more detail, as shown in block 200 of FIG. 2A, the borrower(s) answer a series of configurative questions. These questions relate to goals, needs, wants, etc. of the borrower. The precise questions will vary but are directed toward achieving one or more specific purposes. These questions are optional, but are preferred. The purpose of these questions is twofold. First, the questions allow the potential borrower(s) to focus on exactly what the borrower(s) is/are trying to accomplish. For example, the primary interest might be to obtain funds to purchase real or personal property, to improve monthly cash flow, to reduce payment, to obtain a different type of loan, to alter the monthly loan amount or other terms of the loan, or to refinance and obtain various amounts of cash. Second, the questions make clear to the loan processor and/or eventual lender exactly what the borrower(s) objectives are in seeking the financing so the most appropriate types of loans and terms can be offered to the borrower(s).

Prior to finalizing a loan amount, various items, such as points and fees being charged, type of loan product (conventional, F.H.A., V.A., etc.), lien position, purpose of loan, etc. can be verified with the borrower(s) to be certain that the loan being put in place is the loan most suitable to what the borrower(s) wants. As with the prior questions, these questions can be answered over the phone, on-line, through the mail, by fax, in person, etc.

The logic of FIG. 1 proceeds to block 102 where financial evaluation information is obtained and recorded from at least one financial institution from which the borrower may obtain the loan, financing, credit, etc.

In addition to providing the information from the configurative questions, the borrower(s) provide information sufficient to apply for a loan. This may alternatively comprise actually applying for a loan or financing independently and separately from any person or entity that is a mortgage credit grantor or mortgage arranger (block 202). This application can be done over the phone, on-line or with a live customer service representative assisting the telephone applicant(s). It can also be done through the mail, in person, by fax, or through a global communications system, such as the Internet.

The loan application can also be done with the assistance of a loan processing service that helps answer questions of the borrower, acquire information, and generally assist the borrower in the application process (block 206). There may or may not be a fee charged for this application portion of the service. Loan processors can help explain to potential lenders various aspects of the borrowers credit history that may appear undesirable. They may help consolidate prior loans, to remove or explain adverse credit ratings, or claims, and make the borrower's credit appear more desirable. Some of these aspect involve credit correction which is discussed in further detail later. While the assistance of a third party can be used in the loan application process, the borrower(s) may attempt to apply on his own. The information from this loan application is provided to the same entity having the responses to the configurative questions.

Often, the borrower(s) may be aware of something that needs to be corrected or questioned regarding the credit report of the individual borrower or borrower. The borrower(s) may be aware of this before or become aware of this during the mortgage application process. The borrower could go directly to a credit correction company or be referred by the loan processor to a credit correction company (block 208). There may or may not be a fee charged for this service. The information given to any credit correction company is preferably, but optionally, provided to the same entity that has the responses to the configurative questions.

The purpose of the credit correction is to resolve anything having an adverse effect on the consumer's credit and that is typically achieved by removing incorrect information, closing accounts that the borrower sees no useful purpose in keeping open, negotiating settlements of amounts owed to creditors as well as negotiating the reduction or removal of negative items on the credit report. The credit correction could also coordinate among creditors and the three major credit bureaus (Experian, Transunion and Equifax) to correctly portray outstanding balances, public records items, tax liens, judgments, collections, charge-offs and, in conjunction with Fair Isaac's Company (FICO), all to improve the credit scores of the borrower. Any results of the credit correction are preferably, but optionally, provided to the same entity that has the responses to the configurative questions, especially if the results alter the credit worthiness of the borrower.

The logic then moves to block 104 where a credit grade or score is determined. In conjunction with the previously answered configurative questions, the borrower's mortgage or other financial application will be evaluated based upon objective, pre-set underwriting criteria. One or more, and preferably all, of the credit history, credit score(s), equity, down payment, income, assets, job history and stability could be considered. The criteria need not be inclusive of all lender's criteria. The mortgage credit evaluation system is preferably based upon commonly used industry evaluation systems, including one or more of Fannie Mae, Freddie Mac, F.H.A., V.A., Ginnie Mae, private mortgage insurance companies, or combinations of those evaluation systems. It could also be based upon individual lender's evaluation systems if those are different from the above-mentioned systems. For example, Washington Mutual Bank has significant market share in the United States. The institution may have its own evaluation process, possibly not commonly used within the industry. The results of the evaluation are based on objective, pre-set underwriting criteria provided to the borrower. In exemplary embodiments of the invention, the borrower is provided with his or her credit report and credit grades or scores. The borrower could also be provided with an electronic appraisal of the property. This information could be provided to the borrower via the Internet or via another method, such as via facsimile or mail.

For other types of financing, other financial criteria will apply. For example, a bank's criteria for a credit card, for a line of credit. The criteria is preferably that criteria used by a recognized institution providing the financing desired by the borrower, and the criteria will vary with the institution and the type of criteria involved.

The purpose of would-be borrower(s) knowing independently of any interested mortgage credit grantor or arranger is for the borrower(s) to independently know their borrowing strength and ability. If the borrower(s) know that they have an excellent grade in the mortgage credit granting system, they are armed with valuable information that can help them to negotiate the most favorable terms, e.g., interest rates. See block 212 of FIG. 2A. This may also allow the borrower(s) to receive a better loan suited to their particular needs, preferably, but optionally, as indicated by the borrower's responses to the personal configurative questions. This may not necessarily mean the most favorable interest rate. For example, while a borrower may be able to get 90% cash-out, it may be more valuable to the borrower to get only 80% cash-out. The 90% cash-out will probably carry a less favorable interest rate or more points, or both.

The would-be borrower preferably receives a credit pre-approval from the entity having the responses to the configurative questions and the other above identified information. Alternatively, the would-be borrower receives a full loan approval from the entity having the responses to the configurative questions and the other above identified information. The difference between these two alternatives is that the pre-approval gives a loan amount and loan terms that the borrower is currently eligible for. The actual loan approval means that the borrower(s) have everything in place; a specific property, specific interest rate and loan amount, appraisal, title report, escrow/attorney (closing agent), paperwork, proof of income, assets (if needed), for that particular loan program, and any other required paperwork that might be needed to complete the transaction. The borrower(s) is/are issued a loan number and personal identification (PIN) number.

The approval or pre-approval will be good (locked) for a certain number of days. The number of days will vary based on a variety of circumstances. A loan number is preferably, but optionally, issued in conjunction with commonly used underwriting standards, systems, and criteria. For example, FANNIE MAE might issue a loan number. That loan number could be the loan number issued for the borrower(s) credit pre-approval or loan approval. A personal identification number (PIN) can be used for privacy protection. Preferably, but optionally, the borrower(s), through their PIN number, control who can look at their file. Thus, preferably the borrower's credit information can be owned by the borrower. No one has access to the borrower's identity or information without the borrower releasing the information.

Using this approval or pre-approval information, the borrower(s) can shop on their own. The borrower(s) can shop anonymously through a computerized search engine. Or, the borrower(s) can shop openly with the assistance of a cooperating agency. See block 214.

The borrower(s) may be able to access current interest rate and fee surveys of lender/mortgage companies to compare that information with what the applicant is being quoted by others. See block 212. The borrower(s) may also be able to find out how much the lender/mortgage company is paying for the money being loaned to the borrower or used to provide other financial services to the borrower or applicant. This is similar to finding out what a car dealer pays the manufacturer for the car. Additionally, the mortgage applicant(s) or borrower(s) can analyze the data in a comparable format (wrapping the data). This can help to determine the most beneficial loan or other financial arrangement. This usually, but not always means, the lowest interest rate, the lowest credit rate, etc. that meets the applicant's personal requirements.

After receiving the credit report, loan approval or loan pre-approval, the borrower can go to negotiate a loan on his or her own behalf with any mortgage originator(s) that may financially benefit by packaging and/or funding the borrower's loan. See block 214. The borrower authorizes the mortgage originator to pull-up the approval findings using the pre-approval/approval authorization number. The mortgage originator negotiates a rate and fees for the borrower to be charged, knowing that the loan is already pre-approved and in the belief that the information inputted from the loan application is accurate. The mortgage originator will likely make any mortgage or financing subject to verification of information inputted from the loan application. The rate and fees charged are typically based upon the credit grading of the approval.

With authorization from the borrower, the mortgage originator then collects the information needed from the loan approval findings. The borrower(s) is/are simply handing over the package of required items that the pre-approval/approval has specified. See block 216. The lender formally examines the loan file. The lender locks in interest rate. Upon satisfactory receipt of accurate and valid information (quality control), the file is formally lender approved. The loan documents are drawn. The borrower(s) sign the loan documents. The loan is funded. See block 218. Other types of financial assistance will have different processes that vary with the nature of the transactions involved, such as a credit card, line of credit, etc.

The information compiled by the entity having the answers to the configurative questions can also be used for goods or services related to the purpose for which the borrower is obtaining financing or for helping the borrower obtain such goods or services. See block 220. Thus, the borrower(s) may also need other industry services. Some examples are a closing agent, title company, real estate agent, home inspector, termite company and utility hook-up, all of which are related to a home purchase. A system and method for identifying third party vendors for goods and services related to real estate transactions is disclosed in U.S. Pat. No. 6,321,202, the complete contents of which are incorporated by reference herein. The borrower(s) could find those needed services through this credit granting system, by having the entity with the answers to the configurative questions provide the information to the borrower, or provide the identity of the borrower to providers of the appropriate goods or services. It will be appreciated that these related services are dependent upon and vary with the type of loan or financing being obtained by the borrower. For example, in the case of an auto loan, related services might include auto security devices, etc. There may or may not be a charge for providing contact information for these needed goods and/or services.

After the borrower(s) go through the credit granting process, they may or may not have actually had a loan funded. Within this mortgage credit granting system, there is opportunity for providing future reminders or information on the borrowers' credit report and credit scores, property value, interest rates, borrowing power, etc. The borrower(s) may wish to access information about his/their own property(ies), credit, borrowing power, etc. This could be done by paying or not paying a fee for unlimited usage, periodically sent to borrower(s) (subscription service) or on a per transaction basis. See block 224.

Additionally, the borrower(s) may periodically receive informational bulletins for the purpose of maintaining a relationship between the borrower and the entity having the answers to the configurative questions. See block 226. This could be communicated by fax, Internet, e-mail, delivered mail or by phone, or other communication devices now existing or developed in the future.

The borrower could also access marketing services by giving permission to receive advertising, be contacted about a specific product or service related to home ownership. The borrower could also initiate communication with a related product or service (Agency Service) that can be accessed as part of this credit granting system. There may or may not be a fee charged for this service whether it is the borrower of vendor.

This above method is not designed to be used to actually negotiate mortgages. It could be used to do this, but preferably, it is designed to give the borrower information about their credit grading. If borrowers know that they are acceptable based on commonly used credit-granting standards/systems/criteria (e.g., Fannie Mae, Freddie Mac, F.H.A., V.A., etc.) that typically offer the lowest rates and fees, it makes them less vulnerable to be victimized by predatory lenders and/or mortgage originators that charge unreasonably high rates and fees to a good quality borrower. Similarly, this process allows an applicant to evaluate an aspect of their finances based on accepted criteria used in the trade for the particular financial aspect in question, and enables the applicant to use the resulting information to the advantage of the applicant Borrower privacy is preferably, but optionally, an important critical component to this credit granting system. Preferably, no entity gains access to the borrowers' information without the clear consent of the borrower. Any entity that receives business through this system (e.g., loan processor, credit correction company) is thus preferably contractually obligated to maintain the borrower's privacy. Likewise, affiliated entities having access to borrower information are preferably precluded by agreement from releasing information about that borrower unless the borrower gives permission to do so. Preferably, the information may only be released as specifically instructed by the borrower(s).

There is thus advantageously provided a method by which an applicant seeking financing can provide information to a third party evaluator that will render an independent evaluation of the applicant for the requested financing based on objective criteria used by at least one established entity that can provide the financing sought by the applicant. The applicant can then use that independent evaluation for his/her/its own purposes. Preferably, the applicant will use the evaluation to obtain the desired financing, to negotiate more favorable terms on the financing, or to guard against terms less favorable than are believed to be otherwise available to a person having the independent evaluation.

More preferably, the applicant also provides information relating to the reasons for seeking the financing. That information is preferably, but optionally used by the third party evaluator to select criteria more applicable to the desires of the applicant, or to direct the applicant to financial institutions more likely to suit the applicant's needs or the applicant's desires, or to allow a financial institution to evaluate the applicant's financial requests, or any combination of these. Further, this information can be provided to third party providers who can provide goods or services to the applicant which goods or services are related to the use to which the applicant intends to put the financing.

There is thus provided a method by which a third party can acquire information from an applicant and compare the information with predetermined criteria and provide an evaluation relating to a financial matter. The evaluation can be used to avoid predatory lending, is preferably used to obtain financing in the form of financial assistance to the applicant, and is more preferably used to obtain a financial loan, and is still more preferably used to obtain home mortgage financing. In the mortgage context, the service will preferably provide persons seeking mortgages with information about the amount of money they should be able to borrow based upon current rates. By establishing appropriate arrangements between the third party evaluator and the person providing the mortgage or other financial service, a pre-approval could even be granted by the third party, such as a mortgage pre-approval. Such pre-approval would be subject to the later agreement by the lender or provider of other financial services after verification of the information provided by the borrower or other person seeking financial services.

The method described herein is advantageously implemented by inputting the information from the applicant into a computer, into an electronic device, or into another device which compares at least some of the information to predetermined criteria used by an established entity, be it a person, business or organization, that provides financial services of the type sought or needed by the applicant. Preferably, the criteria is stored in memory and the applicable criteria is selected by the computer automatically or by a person manually, based in part upon personal information provided by the applicant as to the reasons for requesting the financial service. Advantageously, the evaluation also includes specifics on the financial services desired, such as appropriate fee and interest rate ranges based on the loan amount and loan program for a home loan mortgage. A tentative pre-approval can also be provided by the third party evaluator subject to verification of the accuracy of the information provided by the person seeking the financial services.

Advantageously the criteria for providing the requested financial service (e.g., mortgage) is obtained from several providers, preferably the major providers of the desired financial service (e.g., Freddie Mac, Fannie Mae, FHA, VHA, etc). The disclosure and use of the financial criteria will typically be confidential between the third party evaluator and the provider of the desired services. Moreover, the disclosure of the financial criteria preferably includes computer software allowing automated application of the criteria by the third party evaluator. If access to the actual criteria used by providers of the desired service is not available, then in appropriate circumstances software or criteria closely mimicking the desired service provider's criteria can be used. For example, in the home mortgage area if Freddie Mac loan criteria is not available, then loan criteria from Countrywide could be used.

Advantageously, but optionally, the configuration information is also provided to the third party evaluator, and that information is used to help select the financial service providers most likely to provide the service desired. The computer database that is preferably, but optionally used to assist in the evaluation is desirably programed to narrow the financial sources based on the requirements of the person seeking the financial services.

The comparison results in an evaluation that is preferably printed or provided in other tangible form or in a form visually perceptible by the applicant, as for example, a visual display on a computer screen or video monitor. Advantageously, the person seeking the financial services will be provided with an evaluation from the major suppliers of the desired financial services. For example, a credit rating from the three major providers (Experian, Transunion, Equifax) could be provided.

The method described herein can advantageously be used online, with the person seeking financial services filling out his or her own application and transmitting the information over the Internet. The third party evaluator will receive the information and use a computer to search for the requestor's best options based upon the information provided by the requestor and based upon the requestor's specific needs or special requests as identified by the configuration questions. The third party evaluation, in the home loan context, advantageously provides credit reports and scores, loan approval findings and an AVM (automated valuation model) if there is a specific property in question.

Because the requestor (the person seeking the financial services) owns all of the personal information provided to the third party evaluator, and because the information is provided over secured lines and methods of transmittal, the information is confidential and preferably will not be released without permission from the requester. This differs from many, if not all, of the current home loan situations in which the lender owns the application (and thus the information on the application) for a home loan. Indeed, having the lender own the credit information is required by law in order to regulate lenders and inhibit fraud committed by lenders upon borrowers seeking home loans.

The requestor/borrower can then shop for a loan anonymously through any of a variety ways. Once the requestor/borrower finds an acceptable choice, the third party sends the evaluation and some or all of the financial information obtained from the requestor and some or all of the configuration information, to the provider selected by the requestor. This allows the confidential information to be sent only to the person or persons specifically identified by the requestor/borrower. This contrasts significantly with current Internet based loan systems in which financial information is simultaneously submitted to a plurality of predesignated, potential lenders in the hope that one of them will offer to make a loan after internally evaluating the loan request.

Upon receipt of the third party evaluation, the requestor/borrower may also decide to wait and attempt to improve the credit rating or evaluation. Credit problems can be cleared up, debt can be consolidated, etc. Because the evaluation is confidential, there is no adverse report to later hinder the requestor/borrower and there are fewer credit checks showing up on the requestor's credit. There are disadvantages to having a large number of credit checks on a person's credit.

The present method envisions that the person seeking the financial services will incur a legal obligation to pay, and will actually pay the third party for rendering an independent evaluation based on objective criteria. The payment by the person seeking the service is different than reimbursing appraisal fees or the costs of credit reports, and constitutes payment for services rendered. The payment is preferably an out-of-pocket payment by cash, check, money order, credit card etc.

But the payment can in some circumstances be made by the person providing the financial services. An example would be when the third party provides the person seeking the desired financial services with the identification of one or more providers of the desired financial services and the person desiring the financial services actually obtains the services from the provider. In that case, a preexisting arrangement may exist under which the person providing the financial services pays for the evaluation by the third party, gives a financial credit to the person seeking the service, or provides a separate payment to the third party. Moreover, the person providing the financial services may pay the third party evaluator for referring the person seeking the financial services. Because the third party is preferably independent, these payments from the providers are transfers between separate legal entities that have no ownership affiliation, and they must comply with regulatory disclosure requirements. Despite the existence of such financial reimbursements for providing leads to lenders or to other service providers, the third party evaluators are still considered independent. If the third party evaluator is a full time employee of an entity providing the desired financial services or if the third party evaluator receives a percentage commission from an affiliated company based on the loans funded through this program, then the third party would most likely not be considered independent. Either an independent third party, or an affiliated/interested third party could be used, but the affiliated/interested third party is less desirable.

The above description is given in the context of an individual obtaining financial services, using a home loan as an example. The method provided herein is equally applicable to any person, when person is understood to mean any human, as well as any legal entity such as a corporation, partnership, limited liability company, etc.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art. Further, the various features of this invention can be used alone, or in varying combinations with each other and are not intended to be limited to the specific combination described herein.

What is claimed is:

1. A method of assisting a borrower in obtaining a loan, the method comprising:
   (a) receiving, over a network, personal information of a borrower, said personal information including financial information of the borrower, and including information regarding objectives of the borrower in seeking a loan, said personal information obtained, at least in part, via an online form completed by the borrower;
   (b) selecting, based on said information regarding objectives of the borrower, underwriting criteria to be used to generate a credit grading for the borrower;
   (c) programmatically generating the credit grading for the borrower using the selected underwriting criteria, wherein the selected underwriting criteria includes objective criteria used by one or more lenders capable of providing the loan;
   (d) outputting information regarding the credit grading, and information regarding a plurality of lenders capable of providing the loan, to the borrower; and
   (e) subsequently to steps (a)-(d), in response to receiving authorization from the borrower, sending the credit grading and at least some of the personal information of the borrower to a particular one of said lenders selected by the borrower;
   wherein steps (a)-(e) are performed by a third party evaluator that does not provide the loan, and is performed such that none of the received personal information of the borrower is released to any of the lenders without specific authorization from the borrower, whereby the method enables the borrower to assess its borrowing ability and to select a lender for providing the loan without exposing any personal information to any of the lenders, and wherein the method further comprises the third party evaluator receiving, from a lender, software that automatically applies the selected underwriting criteria to information of the borrower.

2. The method of claim 1, wherein the third party obtains said software under an obligation to maintain the selected underwriting criteria confidential.

3. A method of assisting a borrower in obtaining a loan, the method comprising:
   (a) receiving, over a network, personal information of a borrower, said personal information including financial information of the borrower, and including information regarding objectives of the borrower in seeking a loan, said personal information obtained, at least in part, via an online form completed by the borrower;
   (b) selecting, based on said information regarding objectives of the borrower, underwriting criteria to be used to generate a credit grading for the borrower;
   (c) programmatically generating the credit grading for the borrower using the selected underwriting criteria, wherein the selected underwriting criteria includes objective criteria used by one or more lenders capable of providing the loan;

(d) outputting information regarding the credit grading, and information regarding a plurality of lenders capable of providing the loan, to the borrower; and (e) subsequently to steps (a)-(d), in response to receiving authorization from the borrower, sending the credit grading and at least some of the personal information of the borrower to a particular one of said lenders selected by the borrower;

wherein steps (a)-(e) are performed by a third party evaluator that does not provide the loan, and is performed such that none of the received personal information of the borrower is released to any of the lenders without specific authorization from the borrower, whereby the method enables the borrower to assess its borrowing ability and to select a lender for providing the loan without exposing any personal information to any of the lenders, and wherein the method further comprises the third party evaluator issuing a loan number to the borrower while the borrower remains anonymous to the lenders.

4. A method of assisting a borrower in obtaining a loan, the method comprising:

(a) receiving, over a network, personal information of a borrower, said personal information including financial information of the borrower, and including information regarding objectives of the borrower in seeking a loan, said personal information obtained, at least in part, via an online form completed by the borrower;

(b) selecting, based on said information regarding objectives of the borrower, underwriting criteria to be used to generate a credit grading for the borrower;

(c) programmatically generating the credit grading for the borrower using the selected underwriting criteria, wherein the selected underwriting criteria includes objective criteria used by one or more lenders capable of providing the loan;

(d) outputting information regarding the credit grading, and information regarding a plurality of lenders capable of providing the loan, to the borrower; and (e) subsequently to steps (a)-(d), in response to receiving authorization from the borrower, sending the credit grading and at least some of the personal information of the borrower to a particular one of said lenders selected by the borrower;

wherein steps (a)-(e) are performed by a third party evaluator that does not provide the loan, and is performed such that none of the received personal information of the borrower is released to any of the lenders without specific authorization from the borrower, whereby the method enables the borrower to assess its borrowing ability and to select a lender for providing the loan without exposing any personal information to any of the lenders, wherein the method further comprises the third party evaluator providing a full loan approval to the borrower while the borrower remains anonymous to said lenders, said full loan approval provided in connection with a particular real estate property.

5. A method of assisting a borrower in obtaining a loan, the method comprising:

(a) receiving, over a network, personal information of a borrower, said personal information including financial information of the borrower, and including information regarding objectives of the borrower in seeking a loan, said personal information obtained, at least in part, via an online form completed by the borrower;

(b) selecting, based on said information regarding objectives of the borrower, underwriting criteria to be used to generate a credit grading for the borrower;

(c) programmatically generating the credit grading for the borrower using the selected underwriting criteria, wherein the selected underwriting criteria includes objective criteria used by one or more lenders capable of providing the loan;

(d) outputting information regarding the credit grading, and information regarding a plurality of lenders capable of providing the loan, to the borrower; and (e) subsequently to steps (a)-(d), in response to receiving authorization from the borrower, sending the credit grading and at least some of the personal information of the borrower to a particular one of said lenders selected by the borrower;

wherein steps (a)-(e) are performed by a third party evaluator that does not provide the loan, and is performed such that none of the received personal information of the borrower is released to any of the lenders without specific authorization from the borrower, whereby the method enables the borrower to assess its borrowing ability and to select a lender for providing the loan without exposing any personal information to any of the lenders, wherein step (d) comprises outputting information to the borrower regarding specific loans offered by said lenders, and wherein the information about specific loans comprises an indication of an amount a lender is paying for money associated with a loan.

6. A method of assisting a borrower in obtaining a loan, the method comprising:

(a) receiving, over a network, personal information of a borrower, said personal information including financial information of the borrower, and including information regarding objectives of the borrower in seeking a loan, said personal information obtained, at least in part, via an online form completed by the borrower;

(b) selecting, based on said information regarding objectives of the borrower, underwriting criteria to be used to generate a credit grading for the borrower;

(c) programmatically generating the credit grading for the borrower using the selected underwriting criteria, wherein the selected underwriting criteria includes objective criteria used by one or more lenders capable of providing the loan;

(d) outputting information regarding the credit grading, and information regarding a plurality of lenders capable of providing the loan, to the borrower; and (e) subsequently to steps (a)-(d), in response to receiving authorization from the borrower, sending the credit grading and at least some of the personal information of the borrower to a particular one of said lenders selected by the borrower;

wherein steps (a)-(e) are performed by a third party evaluator that does not provide the loan, and is performed such that none of the received personal information of the borrower is released to any of the lenders without specific authorization from the borrower, whereby the method enables the borrower to assess its borrowing ability and to select a lender for providing the loan without exposing any personal information to any of the lenders, wherein the method comprises the third party evaluator selecting and applying the underwriting criteria of a particular lender, as obtained confidentially from said particular lender.

* * * * *